United States Patent [19]

Williamson

[11] Patent Number: 4,840,089

[45] Date of Patent: Jun. 20, 1989

[54] AXLE-CONTROLLED, POSITIVE DIFFERENTIAL

[75] Inventor: Archie O. Williamson, Edina, Minn.

[73] Assignee: Williamson Patent Holding Company, Edina, Minn.

[21] Appl. No.: 194,446

[22] Filed: May 16, 1988

[51] Int. Cl.⁴ .................................................. F16H 1/44
[52] U.S. Cl. ......................................... 74/690; 74/711; 74/713; 74/417
[58] Field of Search ..................... 74/690, 710.5, 711, 74/713, 417, 416

[56] References Cited

U.S. PATENT DOCUMENTS

| | | | |
|---|---|---|---|
| 1,010,166 | 11/1911 | Miggett | 74/713 |
| 1,190,687 | 7/1916 | Tibbetts | 74/710.5 X |
| 1,194,107 | 8/1916 | Whiteside | 74/690 |
| 1,235,249 | 7/1917 | Salfisberg | 74/713 X |
| 1,239,990 | 9/1917 | Ware | 74/713 |
| 1,284,401 | 11/1918 | Mahler | 74/710.5 |
| 1,352,590 | 9/1920 | Elbertz | 74/713 |
| 2,392,441 | 1/1946 | Wildhaber | 74/711 |
| 2,569,015 | 9/1951 | Miller, Jr. | 74/711 |
| 2,671,358 | 3/1954 | Johnston | 74/711 |
| 2,899,845 | 8/1959 | Nogrady, Sr. | 74/711 |
| 3,452,620 | 7/1969 | Hughson | 74/416 X |
| 3,544,055 | 1/1971 | Galaniuk | 74/713 |
| 4,635,505 | 1/1987 | Williamson | 74/713 |
| 4,762,022 | 8/1988 | Johnshoy | 74/711 |
| 4,775,026 | 10/1988 | Sollbach et al. | 74/710.5 X |

FOREIGN PATENT DOCUMENTS

| | | | |
|---|---|---|---|
| 1375442 | 9/1964 | Fed. Rep. of Germany | 74/710.5 |
| 938523 | 10/1963 | United Kingdom | 74/710.5 |

Primary Examiner—Dwight G. Diehl
Assistant Examiner—Christopher C. Campbell
Attorney, Agent, or Firm—Merchant, Gould, Smith, Edell, Welter & Schmidt

[57] ABSTRACT

An improved non-slip differential (10) includes a case (12) with a rotatable control shaft (52) and sliding control bushings (80) supporting a pair of offset bevel gears (50) which are coupled via U-joints (62) to output shafts (48). A pinion gear (64b) is set at an obtuse angle between the bevel gears (50) such that neither bevel gear and corresponding output shaft (48) can be driven to the exclusion of the other. Another pinion gear (64a) set at an acute angle relative to the bevel gears (50) is preferably included for additional load distribution between the bevel gears. A second embodiment (80) incorporates non-toothed bevels (82) and pinions (84a and 84b) in frictional engagement.

29 Claims, 4 Drawing Sheets

AXLE-CONTROLLED, POSITIVE DIFFERENTIAL

TECHNICAL FIELD

The present invention relates generally to drive train components. More particularly, this invention relates to an improved differential for positively applying power from a drive shaft to a pair of driven shafts.

BACKGROUND ART

This invention is an improvement over that shown in my prior U.S. Pat. No. 4,635,505.

During maneuvering, it may be necessary for the wheels on opposite sides of a vehicle to turn at different rates or even in opposite directions. For example, as a four-wheel vehicle rounds a curve, the outer wheels travel a greater distance and therefore must turn faster than the inner wheels. Maneuvering in tight quarters can cause opposing wheels to turn in opposite directions. This presents no difficulties if the wheels are either driven independently or mounted on a dead axle for independent rotation, however, with a live axle a differential is necessary to drive the wheels at different speeds.

Differentials or differential gearing have long been utilized for distributing power between the wheels while permitting one wheel to turn faster than the other, as needed on curves. The differentials of the prior art typically include a ring gear driven by a pinion gear mounted on the drive shaft. The ring gear is secured to a differential case or housing which rotates therewith. Each axle includes a coaxial bevel gear which meshes at right angles with pinions mounted on spindles within the differential case. When traveling straight ahead, the differential case simply rotates with the ring gear, and there is no relative motion between the pinion and bevel gears therein. When rounding a curve, however, one wheel must travel relatively faster. The difference in rotational speed of the axles is compensated for by the pinion gears which permit opposite relative rotation of the bevel gears as the bevel gears are being driven by the differential case such that faster rotation of one axle and wheel is offset by proportionately slower rotation of the other axle and corresponding wheel.

The major disadvantage of conventional differentials has been that all traction can be applied to one axle to the exclusion of the other. That is, if one wheel is slipping on ice or mud while the other wheel is resting on dry pavement, the differential case and pinion gears therein simply turn or "walk" around the stationary bevel gear for the axle of the wheel with traction on dry pavement while the bevel gear for the axle secured to the wheel on ice spins. The differential thus completely controls the power distributed to the axles and, under certain conditions, all power can be expended on one axle without driving the vehicle.

Various positive or so-called non-slip differentials have been developed to overcome this problem, however, the positive differentials of the prior art have been unnecessarily complex and thus expensive. One of the most popular non-slip differentials of the prior art operates only in forward gear but not in reverse.

The differential shown in my prior U.S. Pat. No. 4,635,505 was developed in response to these problems. However, I have found that under some conditions my prior differential may not always lock-up to effect differential drive as expected. There is thus a need for an improved axle-controlled, positive differential whereby traction can be applied, regardless of direction and under all conditions, to the other axle if one axle should slip so that neither axle can be driven alone to the exclusion of the other.

SUMMARY OF INVENTION

The present invention comprises an improved differential which overcomes the foregoing and other difficulties associated with the prior art.

In accordance with one embodiment of the invention, there is provided an axle-controlled, positive differential including a case supported for rotation responsive to drive of an input shaft. A pair of pinion gears of different sizes are supported on a straight shaft between a pair of bevel gears supported on a control shaft, within the case. The bevel and pinion gears are not set at right angles to each other, but are slightly offset from the center-line of the wheel axles. A control bushing is provided about each bevel gear. The outer configurations of the control bushings and the inner configurations of the corresponding portions of the case are noncircular to prevent one bevel gear from revolving or "walking" around within the turning case in the event of slippage of the axle for the other bevel gear. A universal joint can be coupled between each axle and corresponding bevel gear in the differential case to permit the offset of the bevel and pinion gears to that the bevels are set at an acute angle with respect to one pinion and an obtuse angle relative to the other pinion. These bevel gears are supported on opposite ends of a bent control shaft. This control shaft, however, revolves on the unit's wheel center line which means that opposing wheels can rotate freely in opposite directions relative to each other while being commonly driven. However, one wheel cannot stand still while its opposite wheel rotates because the control shaft and control bushings dictate their movement must be together or opposite.

A second inventive embodiment incorporates bevels and pinions in frictional instead of meshed engagement.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
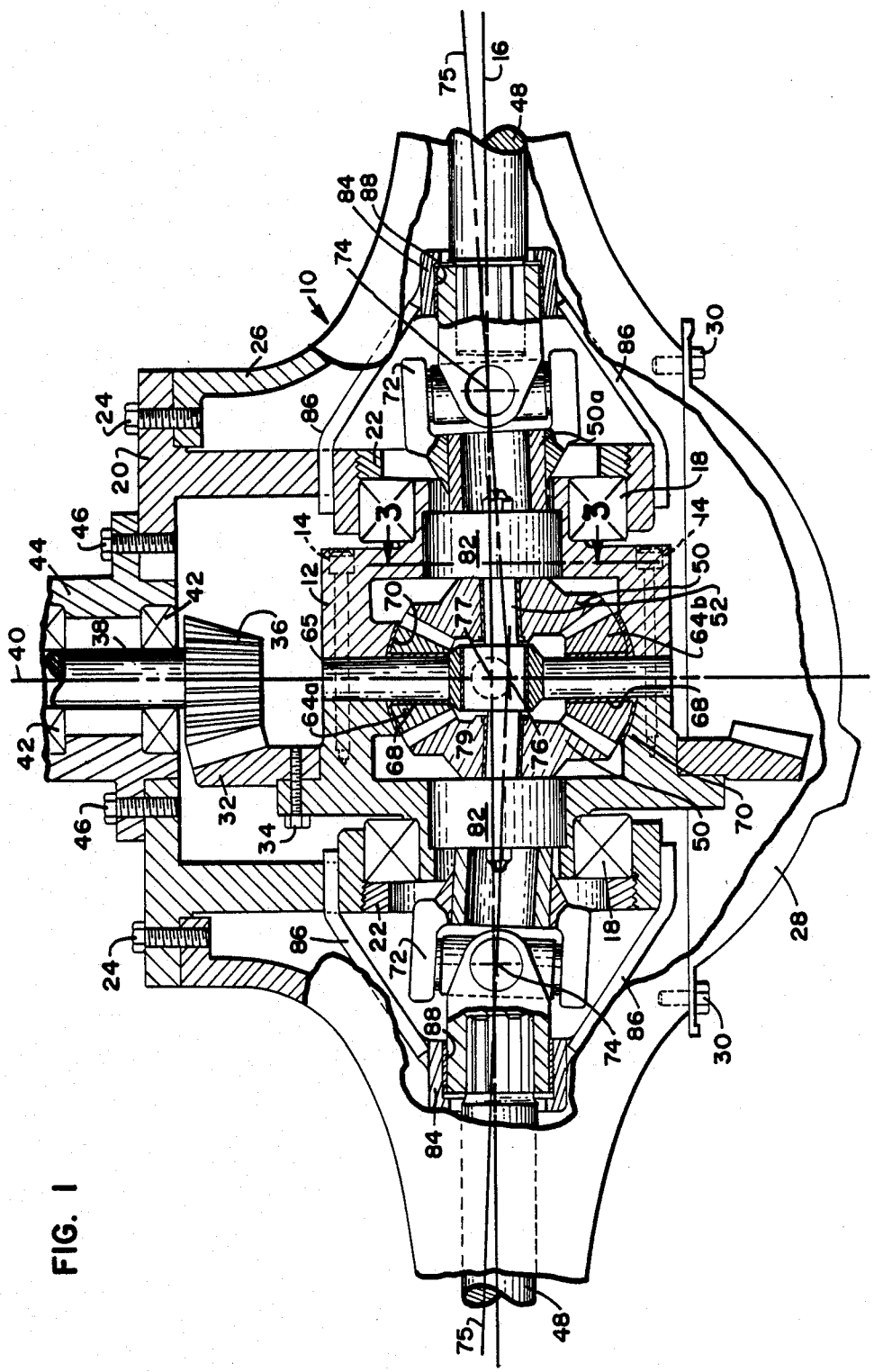
FIG. 1 is a sectional view of the differential incorporating a first embodiment of my invention.

Referring now to the Drawings, wherein like reference numerals designate like or corresponding components throughout the views, and particularly referring to FIGS. 1–5, there is shown a differential 10 incorporating the first embodiment of the invention. The differential 10 is an axle-type differential which is particularly adapted for use in automotive applications, including both two-wheel and four-wheel drive vehicles; however, the invention can be utilized in any application wherein it is desired to divide power from an input shaft between two output shafts subject to different load and rotational conditions. As will be explained more fully hereinafter, differential 10 is an axle-controlled, positive differential whereby power from the input shaft is divided between the two output shafts under all conditions such that neither output shaft can be driven alone to the exclusion of the other output shaft.

Differential 10 includes several components which are substantially similar in construction and function to some components in the differentials of the prior art. Differential 10 includes a case 12 which is shown as being of split construction with the two portions thereof interconnected by bolts 14. Case 12 is supported for rotation about a generally transverse axis 16 between a pair of bearings 18 which in turn are mounted on a pair of corresponding arms of a bearing carrier 20. Retaining rings 22 secure bearings 18 and the differential case 12 carried thereby in place on the bearing carrier 20. Carrier 20 in turn is secured by bolts 24 or other suitable fasteners to one end of a housing 26 which encloses the case 12. A removable cover 28 is secured to the opposite end of housing 26 by bolts 30.

Means are provided for driving the differential case 12. As illustrated, a circular crown or ring gear 32 surrounds case 12 and is secured thereto for rotation by means of suitable fasteners such as bolts 34, only one of which is shown. A pinion gear 36, which is secured to the end of an input shaft 38, is meshed with the ring gear 32 for driving engagement of case 12. Input shaft 38 is supported for rotation about a generally longitudinal axis 40 by a pair of bearings 42 mounted on a collar 44 attached by bolts 46 to the bearing carrier 20. The input shaft 38, which is typically connected to an engine or motor via a transmission, drives ring gear 32 and thus causes rotation of the differential case 12.

Case 12 can also be driven by other means, such as by a chain-and-sprocket arrangement, belt-and-pulley arrangement, spur gears, etc. The particular manner in which case 12 is driven is not critical to practice of the invention.

A pair of output shafts 48 extend outwardly along the axis 16 from opposite sides of the differential case 12. The inner end of each output shaft 48 is secured to a bevel 50 which is rotatably supported in the differential case 12. In particular, the bevels 50 are rotatably mounted in offset relationship on opposite inclined ends of a "bent" control shaft 52. Control shaft 52 includes an integral enlarged circular portion 52a between the opposing inclined shaft ends. Bevels 50 are preferably of equal size. Bushings 54 are preferably provided between bevels 50 and shaft 52, and each bevel is held in place on the corresponding end of the control shaft by a thrust bearing 56, washer 58, nut 60, and cotter pin 62. The bevels 50 are thus supported for rotation in fixed predetermined angular relationship by control shaft 52, which itself is supported for free rotation within case 12.

Figure 4:
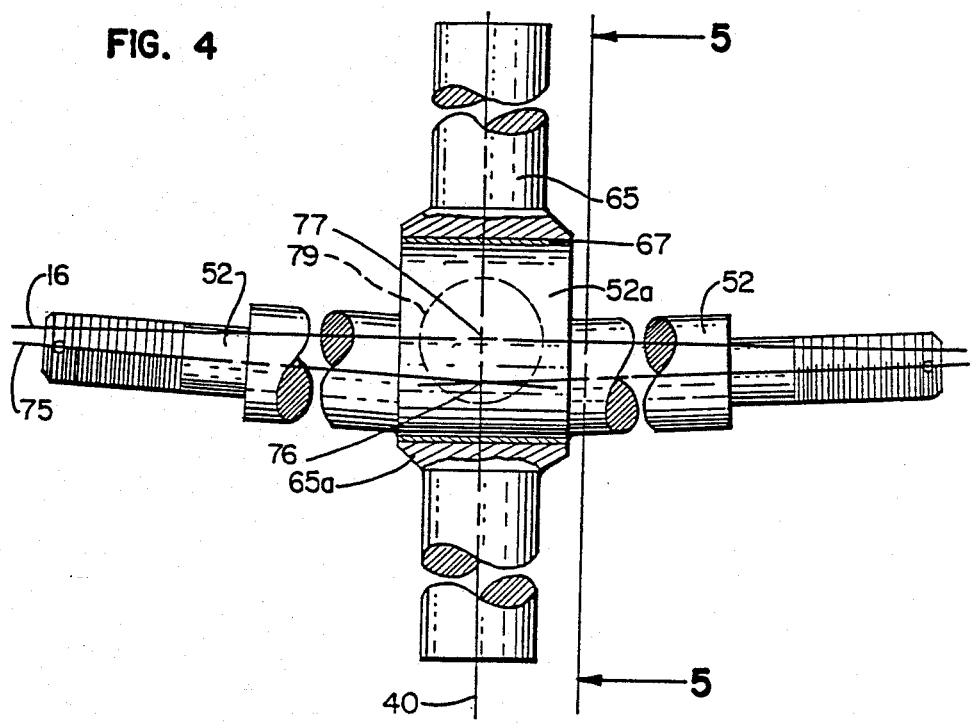
FIG. 4 is an enlarged view of the control shaft which supports the bevels, but which is supported for rotation by the idler shaft supporting the pinions.
Figure 5:
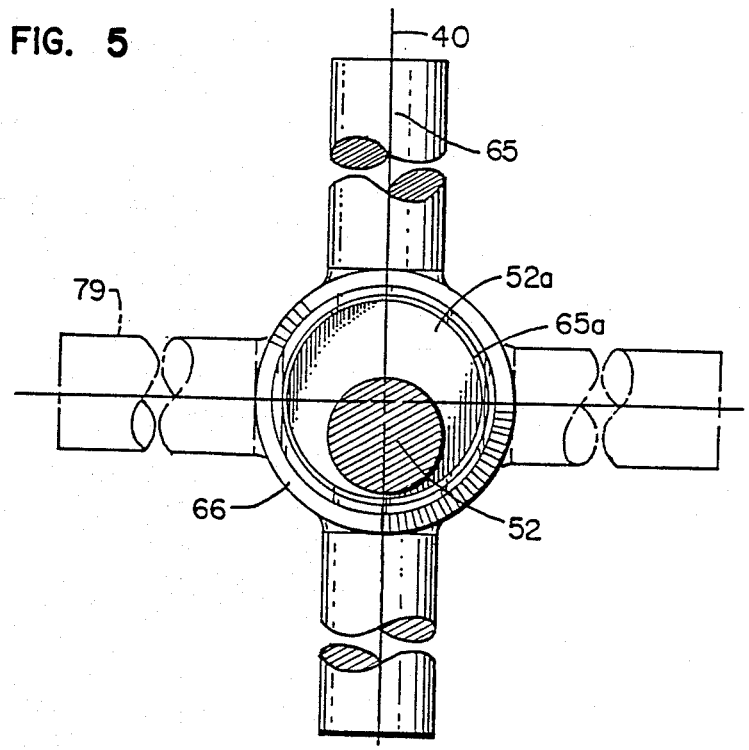
FIG. 5 is a side view of the subassembly shown in FIG. 4.

Bevels 50 in turn are engaged with pinions 64a and 64b which are rotatably supported by a straight idler shaft 65 clamped or otherwise secured within the differential case 12. An integral sleeve or hollow center portion 65a is provided on shaft 65. As is best seen in FIGS. 4 and 5, the center portion 52a of the control shaft 52 is supported within the center portion 65a of shaft 65 for rotation about the transverse axis 16. Bevels 50 are rotatably supported in fixed offset position relative to each other on control shaft 52, which itself is rotatably supported by idler shaft 65 within case 12. A bushing 67 is preferably provided between the inner and outer portions 52a and 65a. Similarly, bushings 68 are preferably provided between pinions 64a and 64b and pin 65, while bellevue washers 70 functioning as thrust bearings are provided between the pinions and the differential case 12. As illustrated, bevels 50 and pinions 64a and 64b include cooperating teeth thereon which mesh together in driving engagement.

If desired, a second idler shaft 79 as shown in phantom lines can be utilized together with shaft 65 for reinforcement.

Bevels 50 and pinions 64a and 64b are thus supported for rotation with the differential case 12, but are also rotatable relative to each other. Assume that differential 10 is part of the drive system of a vehicle. When the vehicle is moving straight ahead, the differential case 12 rotates about axis 16 while bevels 50 and pinions 64a and 64b turning therewith do not rotate relative to each other such that both output shafts 48 are driven at the same speed. When rounding a curve, however, one output shaft 48 must turn relatively faster than the other. This differential motion is compensated for in the well-known manner by opposite relative motion between bevels 50 and pinions 64a and 64b within the rotation case 12 such that a higher speed on one side is offset by a proportionately slower speed on the other side.

In contrast to the differentials of the prior art, however, bevels 50 of differential 10 are not coaxial with axis 16 but are offset therefrom. A U-joint 72 is preferably coupled between each output shaft 48 and corresponding bevel 50. As illustrated, the outside end of each universal joint 72 is secured to its corresponding output shaft 48, while the inside end thereof is secured to the stub end 50a of the corresponding adjacent bevel 50.

As shown, spline connections are utilized between the U-joints 72, stub ends 50a, and output shafts 48; however, key-and-slot arrangements or other suitable connections could be utilized.

The mutually perpendicular axes defined by each universal joint 72 intersect at a point 74 which lies on axis 16. Each bevel 50 is thus rotatable about an offset axis 75, defined by the associated inclined end of control shaft 52, intersecting point 74 on axis 16 and a common focal point 76 on longitudinal axis 40 but offset from the lateral axis. Point 77 represents the intersection of longitudinal axis 40 and lateral axis 16. The pitch surfaces of bevels 50 and pinions 64a and 64b thus also intersect at focal point 76. As illustrated, axes 75 are offset about three degrees from axis 16, however, any suitable offset angle can be utilized, and it will be appreciated that the amount of offset feasible for pinions and bevels of a given size is determined by the distance universal joints 72 can be located away from differential case 12 within the dimensional constraints of the particular application. Bevels 50 are thus set at an acute angle with respect to one pinion 64a, which is the pinion located relatively closer to axis 16, and are also set at an obtuse angle relative to the other pinion 64b farther from the lateral axis.

Figure 2:
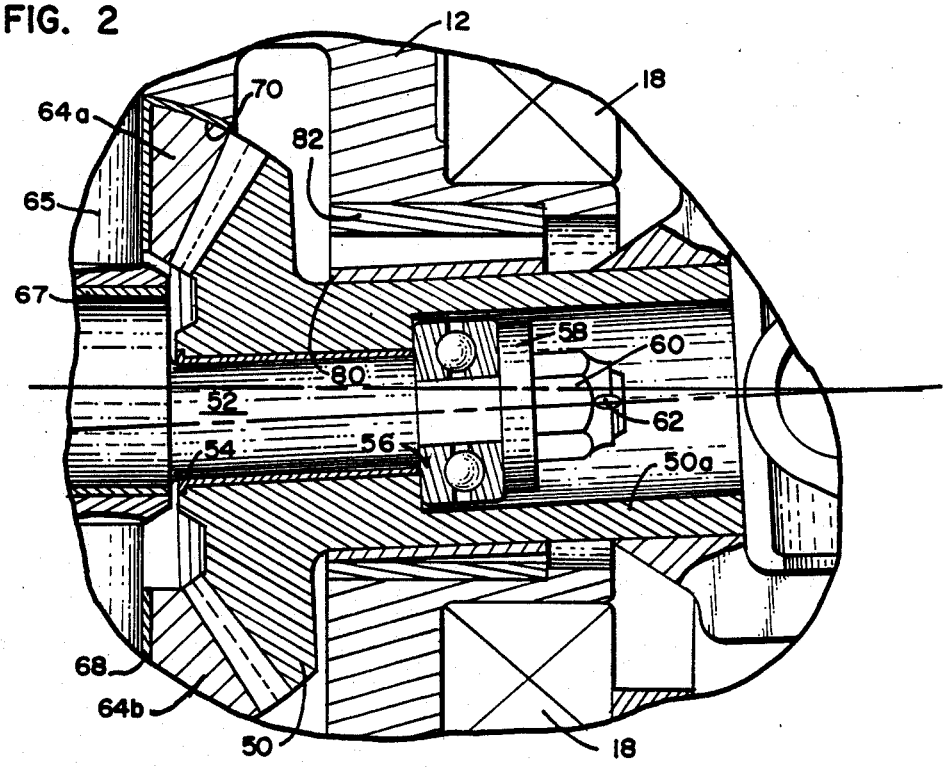
FIG. 2 is an enlarged partial sectional view of the differential shown in FIG. 1.
Figure 3:
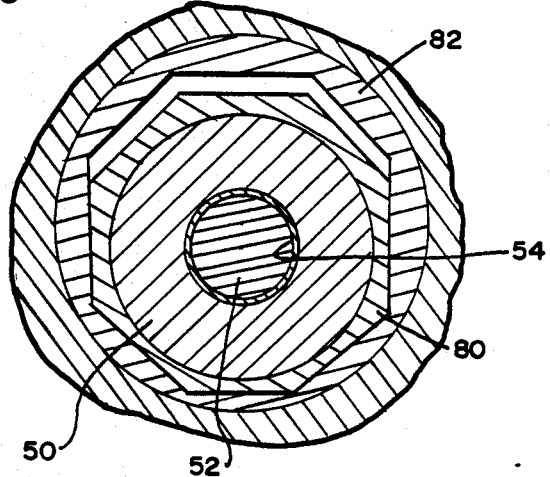
FIG. 3 is a sectional view taken generally along lines 3—3 of FIG. 1 in the direction of the arrows, showing details of the control bushing.

Control bushings 80 are provided between the outer ends of bevels 50 and case 12, as is best seen in FIGS. 2 and 3. Each control bushing 80 includes a round center bore for rotation about the corresponding bevel 50 and end of control shaft 52. However, the outside configurations of bushings 80 are non-circular for limited sliding movement transverse to the ends of control shafts 52 in order to constrain each bevel 50 from revolving or "walking" around inside the case 12 should the other slip. This comprises a significant feature of the invention.

As shown, each bushing 80 is slidably secured within a ring 82 fixed to case 12. The inside configuration of rings 82 is similar to the outside configuration of the control bushings 80, except elongated in a direction transverse to axis 16. If desired, rings 82 can be integral with case 12.

The U-joints 72 are preferably supported in cups 84 fixed to bearing carrier 20 by struts 86, which thus constrain the outer ends of the U-joints from wobbling so that focal points 74 are fixed. Struts 86 are shown turned 90° for purposes of illustration. Thrust bushings 88 are provided between cups 84 and the outer ends of the U-joints 72. If desired, cups 84 and struts 86 can be integral with bearing carrier 20.

Differential 10 functions in the well-known manner when traveling straight ahead or rounding a curve, applying equal or differential drive to the output shafts 48 as necessary. However, the advantages of the invention are particularly evident when one of the output shafts 48 is experiencing little or no traction. For example, in an automotive application where one shaft 48 is coupled to a slipping wheel on mud or ice while the other shaft is coupled to a wheel with good traction on dry pavement, all of the driving power would be channeled by an ordinary differential to the slipping wheel because its corresponding bevel and the pinions would simply run around the other bevel during rotation of the differential case.

Although non-slip differentials have been available heretofore, the differential 10 of the invention accomplishes this in a less complicated fashion by the provision of U-joints 72, permitting offset of the bevels 50 on the angled control shaft 52. Bevels 50 are mounted at acute and obtuse angles with respect to their mating pinions 64a and 64b. The control shaft 52 and control bushings 80 prevent uncontrolled rotation of one bevel relative to the other under such conditions. That is, even though the first bevel 50 connected to the slipping wheel attempts to turn the pinion 64b past the second bevel, the first bevel is constrained against such by bushings 80, whereby the second bevel is carried along with the first bevel in positive engagement as control shaft 52 dictates opposite relative rotation or rotation in the same direction. In other words, even though the pinion 64b attempts to accommodate the slipping wheel by its turning against the bevel 50 of the non-slipping wheel, locking occurs as case 12 attempts to carry the larger pinion 64b with it but is constrained against uncontrolled rotation relative to the case by the corresponding control bushing 80 and ring 82, such that the larger pinion cannot rotate. Bevels 50 of the differential 10 herein must therefore rotate and be driven in unison in the same direction but can still rotate on control shaft 52 in opposite directions against pinions 64a and 64b such a during tight maneuvering by the wheel axle shafts 48. The pinion 64a provides for additional load distribution between the driven bevels 50 and output shafts 48. Differential 10 thus functions as an axle-controlled, positive differential whereby drive of the non-slipping axle is controlled by the slipping axle, not the differential.

Figure 6:
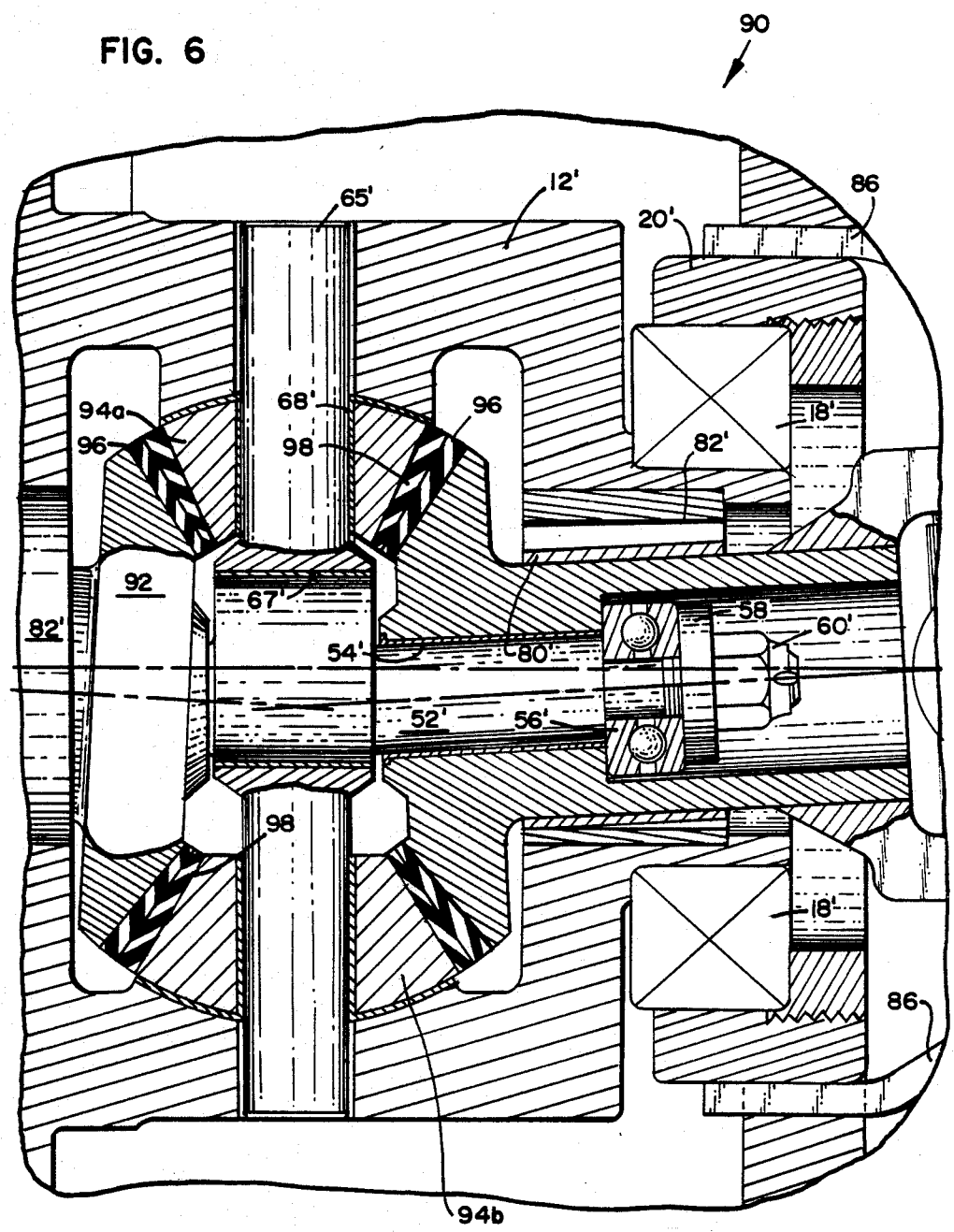
FIG. 6 is an enlarged partial sectional view showing a differential incorporating the second embodiment of my invention.

A second embodiment 90 of the differential incorporating the invention is shown in FIG. 6. Differential 90 includes numerous components which are substantially similar in construction and function to components of differential 10 shown in FIGS. 1–5. Such identical components are identified in FIG. 6 with the same reference numerals utilized in the description of differential 10, but have been differentiated therefrom by prime (') notations.

The primary distinction comprises the fact that differential 90 utilizes bevels 92 and pinions 94a and 94b which are adapted for frictional as opposed to toothed or meshed engagement. As illustrated, the cooperating surfaces of bevels 92 and pinions 94a and 94b are preferably coated with layers 96 and 98 of suitable non-slip material, such as an elastomeric material for example, and are held together in positive loaded engagement by nuts 60'; however, it will be appreciated that pinions and bevels with any suitable type of surfaces in direct contact could also be utilized. Differential 90 is primarily intended for use in light duty applications but otherwise functions similarly to and with the same advantages as differential 10 of the first embodiment.

From the foregoing, it will thus be apparent that the present invention comprises an axle-controlled, positive differential having numerous advantages over the prior art. Either embodiment of the differential herein achieves positive application of power from the input shaft to the output shafts under all conditions without the complication and expense which have characterized the non-slip differentials of the prior art. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternative, modifications, and rearrangements and/or substitutions of elements falling within the scope of the invention as defined by the following Claims.

What is claimed is:

1. In a differential of the type including a driven case supporting a rotatable pinion engaged between spaced-apart opposing bevels for driving respective output shafts, the case and output shafts being rotatable about a common transverse axis, the improvement comprising:

a universal joint coupled between each output shaft and corresponding bevel;

a control shaft supported for free rotation within said case about the transverse axis, said control shaft including opposite inclined ends defining offset axes extending through the corresponding universal joints and a common focal point positioned a predetermined distance away from the transverse axis;

said bevels being rotatably supported on the ends of said control shaft in fixed predetermined relationship offset from the transverse axis so that spacing between said bevels varies between a predetermined minimum and maximum in accordance with circumferential position, with said pinion being engaged between said bevels at the maximum spacing therebetween; and means for constraining said bevels against uncontrolled revolution about the transverse axis relative to said case such that one bevel and corresponding output shaft cannot be driven to the exclusion of the other bevel and corresponding output shaft, thereby effecting positive differential drive.

2. The differential of claim 1, wherein said bevels and pinion are of toothed configurations in meshed engagement.

3. The differential of claim 1, wherein said bevels and pinion are of non-toothed configurations in frictional engagement.

4. The differential of claim 1, wherein said control shaft includes a solid center portion between the inclined ends, and further including:
an idler shaft including a hollow center portion and at least two opposing ends fixed within said case, the solid center portion of said control shaft being rotatably supported in the hollow center portion of said idler shaft.

5. The differential of claim 1, wherein said constraining means comprises:
a control bushing rotatable about each bevel, but constrained by said case for limited sliding movement in a direction transverse to the associated end of said control shaft.

6. The differential of claim 1, wherein each universal joint includes an outer portion secured to the respective output shaft, and further including:
means for rotatably supporting the outer portions of said U-joints in fixed positions.

7. A positive differential, which comprises:
a case rotatable about a transverse axis;
drive means for effecting rotation of said case;
a pair of output shafts extending outwardly from opposite sides of said case;
a generally transverse control shaft supported within said case for rotation about the transverse axis, said control shaft including opposite inclined ends defining offset axes extending through points positioned predetermined equal distances laterally outward along the transverse axis toward the respective output shafts and through a common focal point positioned a predetermined distance off the transverse axis;
a pair of bevels rotatably supported in spaced-apart, opposing angled relationship on the ends of said control shaft;
said bevels being rotatable about the offset axes defined by the ends of said control shaft so that spacing between said bevels varies between a predetermined minimum and a predetermined maximum in accordance with circumferential position;
a universal joint coupled between each output shaft and corresponding bevel;
a first pinion rotatably supported on said case and engaged between said bevels at the maximum spacing therebetween for differential drive; and
means for constraining said bevels against uncontrolled revolution about the transverse axis relative to said case to effect positive, interlocking drive of both output shafts.

8. The positive differential of claim 7, wherein said drive means for effecting rotation of said case comprises:
a ring gear secured to said case;
a drive pinion engaged with said ring gear; and
an input shaft connected to said drive pinion.

9. The positive differential of claim 7, wherein said bevels and said first pinion include teeth thereon in meshed engagement.

10. The positive differential of claim 7, wherein said bevels and said first pinion are of non-toothed configurations in frictional engagement.

11. The positive differential of claim 7, further including:
a second pinion rotatably supported on said case and engaged between said bevels at the minimum spacing therebetween, opposite said first pinion.

12. The positive differential of claim 7, wherein constraining means comprises:
a control bushing rotatable about each bevel, but constrained by said case for limited sliding movement in a direction transverse to the respective offset axis.

13. The positive differential of claim 7, further including:
means for supporting said output shafts for rotation about the transverse axis.

14. A positive differential, comprising:
a case supported for rotation about a transverse axis;
drive means for effecting rotation of said case;
a control shaft including a solid center portion and opposing inclined ends defining offset axes extending through points positioned predetermined equal distances laterally outward along the transverse axis toward the respective output shafts and through a common focal point positioned a predetermined distance off the transverse axis;
means including a hollow center portion fixed to said case for supporting the center portion of said control shaft within said case for rotation about the transverse axis;
a pair of bevel gears rotatably supported in spaced-apart, opposing angled relationship on the ends of said control shaft;
said bevel gears being offset from the transverse axis and rotatable on the ends of said control shaft so that spacing between said bevels varies between a predetermined minimum and a predetermined maximum in accordance with circumferential position;
a universal joint coupled between each bevel gear and a corresponding output shaft;
a pinion gear rotatably supported on said case in meshed engagement between said bevel gears at the maximum spacing therebetween for differential drive of said output shafts; and
means for constraining said bevel gears against uncontrolled revolution about the transverse axis relative to said case to effect positive drive.

15. The positive differential of claim 14, wherein the associated inclined end of said control shaft defining the rotational axis of each bevel gear is offset about three degrees from the transverse axis.

16. The positive differential of claim 14, further including:
a second pinion gear rotatably supported on said case in meshed engagement between said bevel gears at the minimum spacing therebetween, opposite said first pinion gear.

17. The positive differential of claim 14, wherein said constraining means comprises:
a control bushing rotatable about each bevel, but constrained by said case for limited sliding movement in a direction transverse to the offset axes.

18. The differential of claim 14, wherein each universal joint includes an outer portion secured to the respective output shaft, and further including:

means for rotatably supporting the outer portions of said U-joints in fixed positions.

19. A positive differential, comprising:
a case supported for rotation about a transverse axis;
drive means for effecting rotation of said case;
a pair of output shafts extending outwardly from opposite sides of said case;
a control shaft including a solid center portion and opposing inclined ends defining offset axes extending through points positioned predetermined equal distances laterally outward along the transverse axis toward the respective output shafts and through a common focal point positioned a predetermined distance off the transverse axis;
means including a hollow center portion fixed to said case for supporting the center portion of said control shaft within said case for rotation about the transverse axis;
a pair of non-toothed bevels rotatably supported in spaced-apart opposing angled relationship on the ends of said control shaft;
said non-toothed bevels being offset from the transverse axis and rotatable on the ends of said control shaft so that spacing between said bevels varies circumferentially between a predetermined minimum and a predetermined maximum in accordance with circumferential position;
a universal joint coupled between each output shaft and corresponding non-toothed bevel;
a non-toothed pinion rotatably supported on one end of said idler shaft in frictional engagement between said bevels at the maximum spacing therebetween for differential drive of said output shafts; and
means for constraining said non-toothed bevels against uncontrolled revolution about the transverse axis relative to said case to effect positive drive.

20. The positive differential of claim 19, wherein the associated inclined end of said control shaft defining the rotational axis of each bevel gear is offset about three degrees from the transverse axis.

21. The positive differential of claim 19, further including:
a second pinion rotatably supported on the other end of said idler shaft in frictional engagement between said bevels at the minimum spacing therebetween, opposite said first pinion.

22. The positive differential of claim 19, further including:
coatings of non-slip material on confronting surfaces of said pinion and bevels.

23. The differential of claim 19, wherein said constraining means comprises:
a control bushing rotatable about each bevel, but constrained by said case for limited sliding movement in a direction transverse to the respective offset axis.

24. The portion differential of claim 19, further including:
means for supporting said output shafts for rotation about the transverse axis.

25. A positive differential, comprising:
a case supported for rotation about a transverse axis;
drive means for effecting rotation of said case;
a pair of rotatable bevels positioned within said case;
control means for supporting said bevels in spaced-apart, opposing predetermined angled relation in said case for separate rotation about offset axes extending through points positioned predetermined equal distances laterally outward along the transverse axis toward the respective output shafts and through a common focal point positioned a predetermined distance off the transverse axis, as well as for common rotation about the transverse axis, but while constraining said bevels against uncontrolled revolution about the transverse axis relative to said case, so that spacing between said bevels varies between a predetermined minimum and a predetermined maximum in accordance with circumferential position;
a universal joint coupled between each bevel and a corresponding output shaft;
means for rotatably supporting each universal joint in fixed position relative to said case; and
a first pinion rotatably supported on said case and engaged between said bevels at the maximum spacing therebetween so that said pinion permits relative rotation of said bevels for differential drive.

26. The differential of claim 25, wherein said bevels and said first pinion are of toothed configurations in meshed engagement.

27. The differential of claim 25, wherein said bevels and said first pinion are of non-toothed configuration in frictional engagement.

28. The positive differential of claim 25, wherein said bevel control/supporting means comprises:
a control shaft including a solid center portion and opposite inclined ends centered on the offset axes;
an idler shaft including a hollow center portion and opposite ends fixed to said case, the center portion of said idler shaft supporting the center portion of said control shaft for rotation about the transverse axis; and
a pair of bushings one rotable about each bevel, but constrained by said case for limited sliding movement in a direction transverse to the respective offset axis.

29. The positive differential of claim 25, further including:
a second pinion rotatably supported on said case and engaged between said bevels at the minimum spacing therebetween, opposite said first pinion.

* * * * *